United States Patent [19]

Gaudin et al.

[11] Patent Number: 4,821,943
[45] Date of Patent: Apr. 18, 1989

[54] DEVICE FOR WELDING INSIDE A TUBE OF SMALL DIAMETER

[75] Inventors: Jean-Paul Gaudin, Chassieu; Jean P. Peyrot, Chilly-Mazarin, both of France

[73] Assignee: Framatome, Courbevoie, France

[21] Appl. No.: 215,972

[22] Filed: Jul. 7, 1988

[30] Foreign Application Priority Data

Jul. 10, 1987 [FR] France ................. 87 09872

[51] Int. Cl.⁴ ............. B23K 37/00; B23K 9/225; F16L 55/18
[52] U.S. Cl. ............. 228/45; 228/119; 29/402.09; 29/402.16; 219/60.2; 219/66; 285/15
[58] Field of Search ............. 228/119, 29, 45, 183; 29/157.4, 402.09, 402.16, 282; 219/60 R, 60.2, 66; 285/15

[56] References Cited

U.S. PATENT DOCUMENTS 4,410,391 10/1983 Thomas et al. ............. 29/402.09

FOREIGN PATENT DOCUMENTS

| 96772 | 12/1983 | European Pat. Off. | ............ 228/119 |
| 2211721 | 7/1974 | France | ............ 228/119 |
| 0090725 | 10/1983 | France | ............ 228/119 |
| 2585500 | 1/1987 | France | ............ 228/119 |
| 2598210 | 11/1987 | France | ............ 228/119 |
| 1579321 | 11/1980 | United Kingdom | ............ 219/60.2 |

Primary Examiner—Nicholas P. Godici
Assistant Examiner—Samuel M. Heinrich
Attorney, Agent, or Firm—Pollock, Vande Sande & Priddy

[57] ABSTRACT

The drive mechanism for driving the welding head (17) in rotation in the tube is arranged in a motor casing (18) inserted between first and second sections (16a, 16b) of a flexible tubing. The translational movements of the welding head (17) for positioning it in the tube (3) are provided by the sections (16a) of the flexible tubing. The transmission of rotation between the drive mechanism and the welding head (17) is provided by a flexible transmission member arranged in the second section (16b) of the flexible tubing. The device is intended in particular for welding a small repair liner at any height in a steam generator tube of a pressurized-water nuclear reactor.

12 Claims, 4 Drawing Sheets

FIG_1

DEVICE FOR WELDING INSIDE A TUBE OF SMALL DIAMETER

FIELD OF THE INVENTION

The invention relates to a device for rotary welding inside a tube of small diameter, in particular inside a steam generator tube crimped at one of its ends into a tube plate of great thickness.

BACKGROUND OF THE INVENTION

The steam generators of pressurized-water nuclear reactors comprise a bundle of tubes whose ends are crimped into a tube plate whose thickness is generally greater than 500 mm. The tubes of the bundle, which are made of nickel alloy, have an internal diameter of slightly less than 20 mm.

After the steam generator has been operating for a certain time, certain tubes of the bundle may exhibit more or less pronounced damage, and in particular fissures across their wall. In this case, the tube no longer provides a perfect separation between the pressurized primary water in contact with its inner wall and the feed water of the steam generator in contact with its outer surface. The tube must therefore either be plugged to take it out of service, or a repair of the tube wall must be performed in its fissured region.

The tubes of a steam generator may be repaired by lining, this operation consisting in introducing a liner into the tube and in ensuring its fastening to the inner wall of the tube, on each side of the fissured region.

The fastening of the liner, generally by diametral expansion and by expanding by rolling, must be supplemented by welding the ends of the liner to the tube, over their entire periphery, so as to provide a perfectly sealed connection between the tube and the liner. This operation may be performed by using a rotary TIG welding device comprising a welding head which is introduced into the tube in the region of the ends of the liner which has been fastened beforehand into the tube. The welding head comprises a carrier to which are fastened a component permitting the head to be guided in the tube and an electrode arranged radially in relation to the head and to the tube into which the head is introduced.

The welding head is mounted so that it can rotate around its axis at the end of a welding probe which may be constructed in a completely rigid form or, on the contrary, may consist of flexible sections and rigid sections. The welding probe comprises conduits for feeding the welding head with protective inert gas and with cooling water, a cable for supplying a welding current to the electrode, and means for rotating the welding head and its electrode about the tube axis.

In the case of rotary welding inside the steam generator tubes of a pressurized-water nuclear reactor, the welding probe must be introduced into each of the tubes which is being lined, through the entry face of the tube plate, inside the waterbox of the steam generator.

This waterbox, hemispherical in shape, comprises two compartments each of which is accessible through a manhole.

The space inside the waterbox, which comes into contact with the primary water, shows some radioactivity, with the result that operations inside the waterbox must be of very low duration or must be controlled from outside the waterbox.

Furthermore, the introduction of a rigid tool of some length into the tubes of the bundle is possible only in the middle part of this bundle, since, as a result of the hemispherical shape of the waterbox, the space available under the tube plate quickly becomes too small in the case of the tubes situated near the periphery of the bundle, to make it possible to ensure that the tool introduced is positioned vertically.

Proposals have therefore been made for operating procedures which are adapted to the case of the peripheral tubes of the bundle, and corresponding devices which make it possible to perform the various operations involved during the lining operation.

However, until now no rotary TIG welding probe adapted to the case of the peripheral tubes of a steam generator has been proposed.

The majority of the devices proposed in the case of operations in the tubes of a steam generator, and particularly in the peripheral tubes, comprise rigid parts and flexible parts connected together, forming a movable tool which can be moved in a guide tube providing the connection between the outside of the waterbox and the inlet of the steam generator tube in which the operation takes place. By virtue of such movable and flexible tools, operations or checks can be carried out in steam generator tubes at any height inside these tubes.

Until now, it has not been possible to design a welding probe offering the same advantages as the devices mentioned above and permitting an operation in order to weld a liner at any height inside a steam generator tube.

In fact, the welding probe must ensure a highly accurate positioning of the welding head in the tube and a perfect rotational guidance of this head during the welding. These conditions are difficult to achieve with an assembly comprising flexible parts and rigid parts and driven in rotation by a driving means situated outside the waterbox.

There is a known, remote-controlled welding device which may be employed for fastening liners in steam generator tubes, and which comprises a rigid welding head fastened to the end of a flexible tubing which carries internally side the means for feeding the welding head, and by means of which the positioning of the welding head can be carried out in the region of any tube of the bundle. This welding unit employs a carrier device of known type, which is fastened under the tube plate and which makes it possible to support and to position in the region of any tube of the bundle the end of a flexible guide tube in which the welding head moves together with its flexible connection tube.

Also fastened to the carrier device is a means permitting the welding head to be moved inside a steam generator tube and to be positioned in a perfectly determined position inside the tube, together with a set of bearings and driving means permitting the welding head to be rotated inside the tube.

The use of a device of this kind is limited, since the rigid welding head must continually remain in engagement with the bearings and with driving means carried by the carrier device situated under the tube plate.

The length of the rigid welding head must be limited to a relatively low value, above all when the ability to perform the operations in the tubes situated at the periphery of the bundle is desired.

It is therefore not possible to perform welding operations at a considerable height inside the tube.

The welding assembly according to the prior art can, in fact, be employed only for performing welding operations inside the tube plate or, at best, in the vicinity of its outlet face.

SUMMARY OF THE INVENTION

An object of the invention is therefore to provide an orbital welding device inside a tube of small diameter, in particular inside a steam generator tube crimped at one of its ends into a tube plate of great thickness, consisting of a welding head with a diameter smaller than the internal diameter of the tube, comprising a carrier, to which a guiding component and a radially directed electrode are fastened, which is fastened to the end of a flexible tubing and by means for moving the welding head in axial translation in the tube and in rotation about the tube axis, this device permitting welding operations to be carried out at any height in the steam generator tube, in regions far from the tube plate and, optionally, in the region of the various spacers retaining the bundle and arranged in locations spaced at regular intervals along the height of the bundle.

To this end, the driving means for rotating the welding head is arranged in a motor casing inserted between two sections of the flexible tubing, one of these sections connecting the casing to a bush in which the welding head is mounted so that it can rotate, and comprising a flexible component for transmitting the rotary motion between the driving means and the welding head, and the other section being connected at one of its ends to the motor casing and coupled with a puller-pusher device for moving the flexible tubing and thereby the welding head and the motor casing.

BRIEF DESCRIPTION OF THE DRAWINGS

In order that the invention may be more clearly understood, a description will now be given, by way of example of an embodiment of an orbital welding device according to the invention which can be employed for performing welding operations at any height in a steam generator tube of a pressurized water nuclear reactor.

DESCRIPTION OF PREFERRED EMBODIMENT

Figure 1:
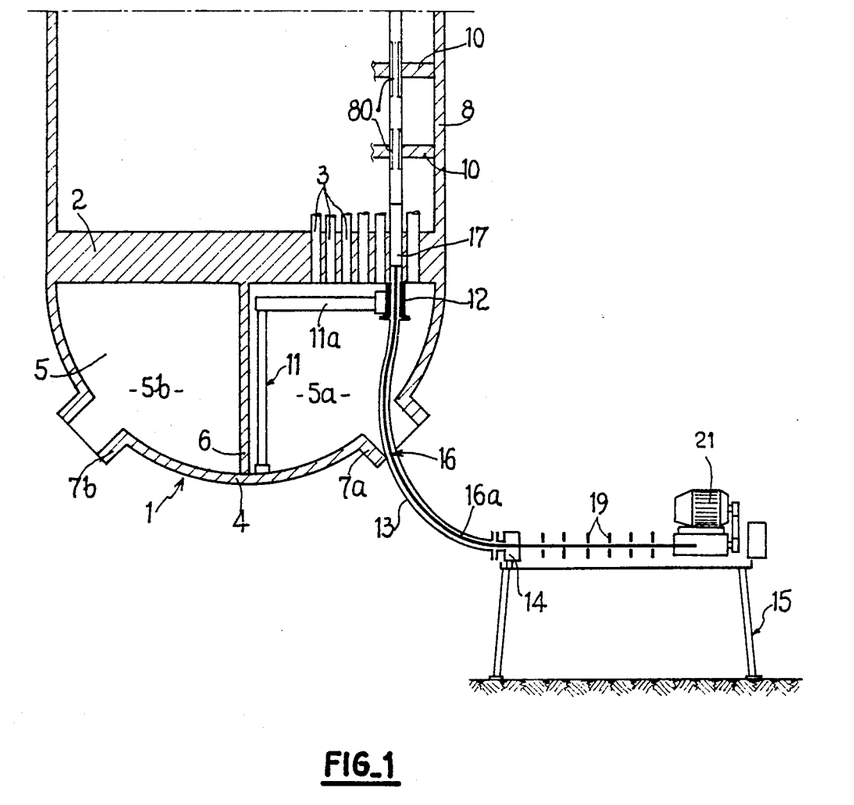
FIG. 1 is a general view of the welding device in working position in a steam generator of a pressurized water nuclear reactor.

FIG. 1 shows diagrammatically the whole of the welding device in working position in a steam generator whose lower part 1 has been shown.

The steam generator comprises a tube plate 2 of great thickness, into which are fastened the lower ends of the tubes 3 of the exchange bundle of the steam generator. Below the tube plate 2, the steam generator comprises a convex bottom defining a waterbox in two parts 5a and 5b, separated by a partition 6. Each of the parts 5a and 5b of the waterbox 5 comprises a corresponding inspection opening or manhole 7a, 7b.

The repair of the bundle tubes 3 requiring, in each of the tubes, an orbital welding operation of a liner inside the tube 3, is carried out at a time when the reactor is stopped, the waterbox 5 and the tubes 3 no longer containing any primary water.

Above the tube plate 2, the steam generator shell 8 defines a space in which the feed water is heated and vaporized in contact with the outer surface of the tubes 3. In this part of the steam generator, defined by the shell 8 and containing the bundle, the tubes are supported at regular intervals along the height of the steam generator by spacer plates 10.

The device according to the invention permits the welding of a liner to be carried out in a tube 3 of the bundle at any height and, in particular, in the region of a spacer plate 10 situated at any level along the height of the bundle.

The positioning of the welding assembly according to the invention in any tube 3 of the bundle makes it necessary to use a carrier device 11 of a known type, which is introduced into the corresponding compartment (5a in this case) of the waterbox of the steam generator during the maintenance and repair operations on the steam generator. This carrier device 11 of a known type can be fastened to the tube plate 2 and comprises an arm 11a whose end can be placed successively vertically in line with each of the ends of the tubes 3 opening into the compartment 5a of the waterbox. This end of the arm 11a carries a rigid guide tube 12 and the end of a flexible guide tube 13 connected to the tube 12.

Outside the waterbox, the end of the tube 13 away from the carrier 11 is connected to the outlet 14 of a transfer machine 15 which makes it possible to ensure that a welding probe 16 comprising a flexible tubing 16a of great length, to the end of which the welding head 17 is fastened, can move in the tube 13.

The guidance tubing 13 enters the waterbox through the manhole 7a.

The transfer machine 15 comprises a motor 21 permitting the flexible tubing 16a to be provided with movement in either direction, while the components 19, connected together by small chains, ensure that the flexible tubing is centered during these movements. The translational movement of the flexible tubing 16a inside the guide tube 13 makes it possible to ensure the positioning of the welding head 17 under the tube plate 2, vertically in line with a tube 3 in which the welding is carried out, and then the movement of this welding head in the tube 3, as will be described later.

Figure 2:
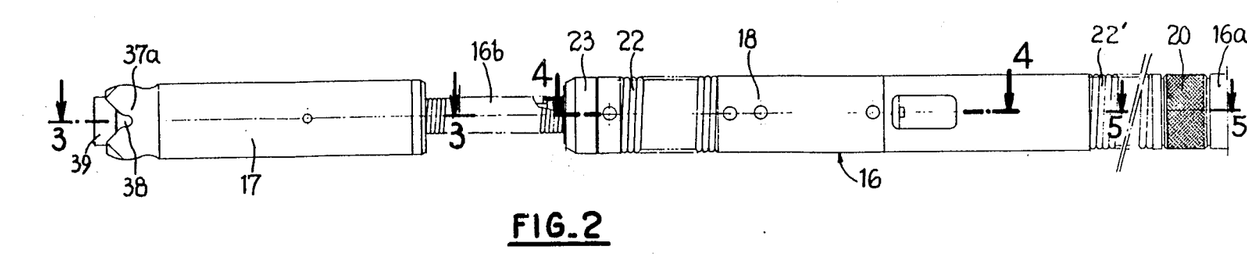
FIG. 2 is a general side view of the welding probe of the device shown in FIG. 1.

FIG. 2 shows the welding prove 16 comprising a flexible tubing in two parts 16a, 16b and a welding head 17 fastened to the end of the part 16b of the flexible tubing.

Between the successive sections 16a and 16b of the tubing, the welding probe comprises a motor casing 18 connected to the sections 16a and 16b of the flexible tubing by means of flexible connection sections 22 and 22', respectively, and of connecting components 20 and 23 respectively.

Figure 3:
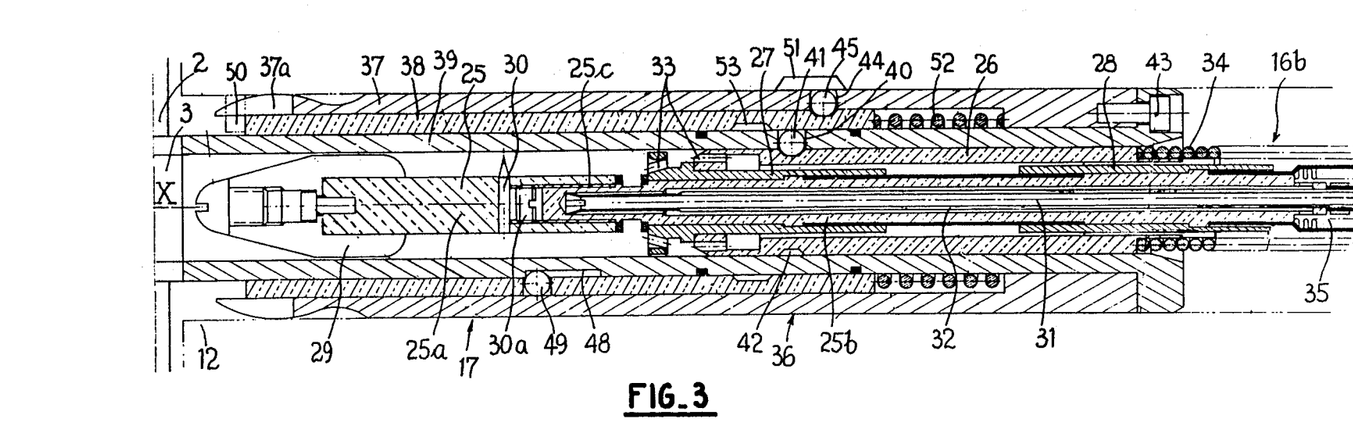
FIG. 3 is a view of the welding head of the device in section along line 3—3 of FIG. 2.
Figure 4:
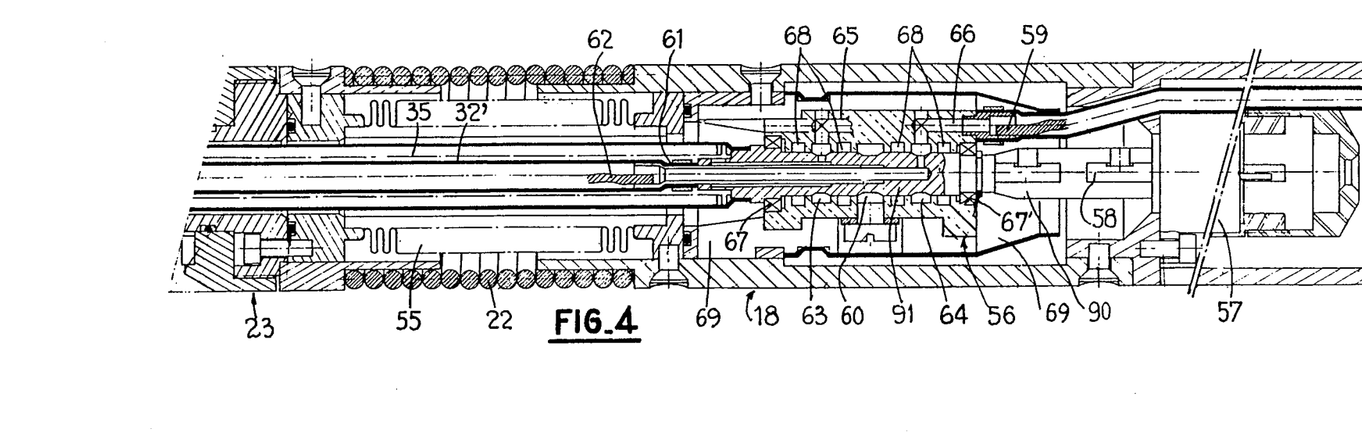
FIG. 4 is a view of the motor casing of the device in section along line 4—4 of FIG. 2.
Figure 5:
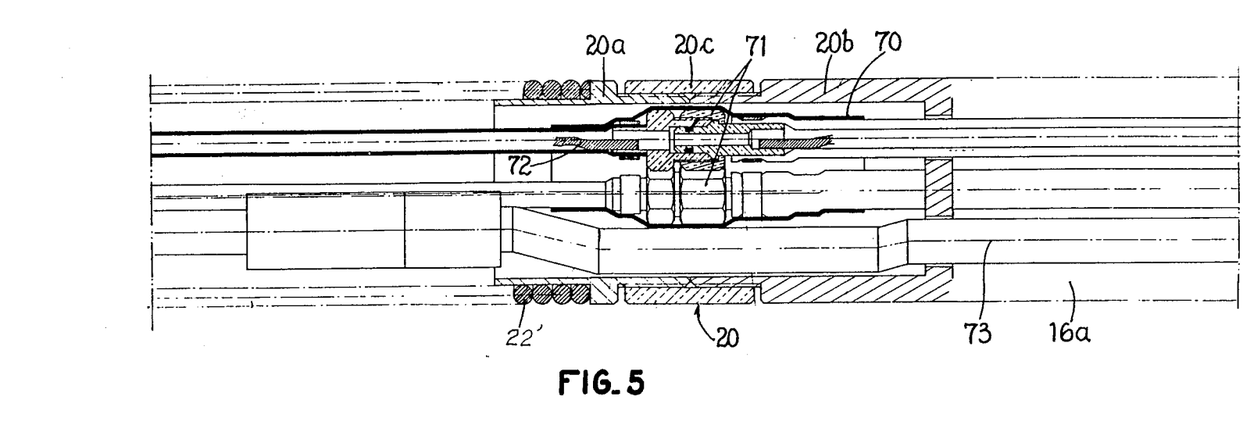
FIG. 5 is a view in section along line 5—5 of FIG. 2.

Reference will now be made to FIGS. 3, 4 and 5 to describe the various parts of the welding probe 16.

FIG. 3 shows the welding head 17 comprising a carrier 25 mounted so that it can rotate about the axis XX' of the welding probe, inside a bush 26, by means of plain bearings 27 and 28 integral with the carrier 25.

The carrier 25 is made in two parts 25a and 25b, assembled together by means of corresponding threaded parts 25c.

At its end, the forward part 25a of the carrier carries a guiding knob 29 of profiled shape whose maximum diameter is slightly smaller than the internal diameter of the steam generator tubes 3. The carrier 25a also carries the welding electrode 30 arranged radially in relation to the probe axis XX'. The electrode 30 is introduced into a radial housing in the carrier 25 and held in position by a screw 30a engaged into the threading 25c. The electrode is thus removable, and its conically shaped end can be placed in a very precise position in the radial direction. When the welding head is introduced into a steam generator tube 3, the distance between the point of the electrode 30 and the tube can therefore be adjusted to an extremely precise value.

The part 25b of the carrier 25 is made in a tubular shape and in its middle part comprises a blind channel 31 whose end is situated in the region of the parts connecting the components 25a and 25b, and in which a central tube 32 with an axis XX' is placed, permitting the electrode to be provided with electrical supply and water cooling, as will be explained later.

The carrier 25 and the bush 26 define a set of flow channels 33 for inert gas purging of the welding region.

At its rear end, the welding head 17 is connected to the part 16b of the flexible tubing, by means of the bush 26 and by means of the part 25b of the carrier 25, respectively. The bush 26 is connected to a tubing 34 consisting of helically wound wires with adjoining turns. The part 25b of the carrier 25 is connected to a tubing 35 consisting of a tube whose wall has successive waves in a radial direction. The tubings 34 and 35, which are made in flexible form and are arranged coaxially, form the section 16b of the flexible tubing of the welding probe.

The tubing 34 and the tubing 35 define an annular passage space for the inert gas purging of the welding region.

Both the electrical supply and the cooling water supply to the welding head are provided inside the tubing 35, as will be explained later.

The welding head carrier 25 and the bush 26 are arranged inside a protective sleeve 36 consisting of three small coaxial sleeves 37, 38 and 39, the bush 26 being mounted so that it can slide in the inner bore of the small inner sleeve 39.

The small sleeve 39 comprises a housing 40 passing through its wall, in which a locking ball 41 is engaged. The bush 26 comprises a groove 42 in its outer surface, into which the locking ball 41 can be engaged.

During its transfer in the guiding tube 13 and in the guide tube 12, the welding head 17 is arranged inside the protective sleeve 36, as shown in FIG. 3.

The small sleeves 37 and 39 are kept integrally fastened to each other by screws such as 43, engaged into their rear ends. These two small sleeves 37 and 39 together define an annular space in which the small sleeve 38 is mounted so that it can slide. The small sleeve 37 is pierced by an opening 44 which serves to house a locking ball 45 which is normally engaged in an opening provided in the small sliding sleeve 38. The small sleeve 39 also comprises a groove 48 in which is engaged a guiding ball 49 arranged in a housing passing through the intermediate small sliding sleeve 38.

During movements of the welding head 17 inside the flexible guiding tube 13, all of the small sleeves 37, 38, 39 and the bush 26 are kept locked in the axial direction by the locking balls 41 and 45.

When the welding head 17 is engaged in the guide tube, as shown in FIG. 3, the end of the small intermediate sliding sleeve 38 abuts on a stud 50 integral with the tubing 12 and projecting inwards. This abutment takes place at the instant when the inner small sleeve 39 is at a very short distance from the inlet face of the tube plate 2, this small sleeve 39 bearing on the tube plate or on the end of the tube 3 which projects slightly in relation to the inlet face of the tube plate 2. The stud 50 is arranged in the tubing 12 so as to be able to pass between the two parts of the profiled end 37a of the small sleeve 37, both these parts being shown in FIG. 2.

The profiled end 37a of the small sleeve 37 makes it possible to facilitate the travel of the welding head 17 in the flexible guiding tube and the introduction into the guide tube 12, while providing very good guidance.

When the protective sleeve 36 comes into abutment on the stud 50 by means of the small sleeve 38, the locking ball 45 is situated in the region of a slot 51 machined into the inner surface of the guide tube 12.

If pressure continues to be exerted on the welding head, the ball 45 draws aside outwards by entering the slot 51. Relative movement can then take place between the small sleeve 38 and the small sleeves 37 and 39, a spring 52 inserted between the small sleeve 38 and the small sleeve 37 being then compressed.

When it retreats, the small sleeve 38 presents a slot 53 opposite the locking ball 41. The locking ball 41 can then move aside outwards, entering the slot 53. This unlocks the welding head as such, consisting of the bush 26 in which the carrier 25 is mounted so that it can rotate.

When an axial thrust continues to be exerted on this assembly, it provides its axial movement inside the protective sleeve 36, and then inside the tube 3 situated in the extension of the inner small sleeve 39.

After welding, when the carrier 35 and the bush 26 are again moved down into the protective sleeve 36, the same device makes it possible to effect the locking of this sleeve by the action of the return spring 52. The welding head 17 can then again be moved inside the flexible tubing 13, inside its protective sleeve 36.

FIG. 4 shows the assembly for mechanical connection 23 between the section 16b of the flexible tubing and the motor casing 18. This mechanical assembly 23 consists of a set of rings connected together by screwed couplings. The flexible tubing 34 consisting of a helical winding with adjoining turns of square cross-section is fastened to the end of one of these rings to ensure the continuity of the coupling of the flexible tubing 16b.

The flexible tubing 35 passes, with some radial clearance, through the inner bore of the rings 23. The tubing 35 is covered internally and externally by flexible sheaths made of retractable, insulating and leakproof material. The inner sheath of the tubing 35 forms the flexible tubing 32' arranged in the extension of the rigid tube 32. A sufficient space is kept between the sheath 32' and the inner surface of the flexible tubing 35 for the cooling water for the welding head to flow in the direction of this welding head. The cooling water returns via the inside of the sheath 32'.

The flexible section 22 providing the coupling between the mechanical assembly 23 and the casing 18 is connected, on the one hand, to one of the rings of the assembly 23 and, on the other hand, to the forward part of the casing 18. Inside this flexible section 22, which caries the flexible tubing 35 along its axis, this tubing 35 is isolated from the outside by a bellows 55. The bellows 55 is inserted between the rear face of one of the rings 23 and the forward closure face of the casing 18.

The casing 18 contains a collector bearing 56 and a motor 57 for driving the welding head in rotation.

The output shaft 58 of the motor 56 is connected by an insulating coupling 90 forming the stationary part of the collector to the rotating part 91 of the collector, arranged inside the bearing 56. Where it leaves the bearing 56, the rotating part 91 is connected to the end of the flexible tubing 35. The rotation of the motor 57 can thus be transmitted to the carrier 25 of the welding head 17 by means of the tubing 35 which can distort in flexure but is rigid in rotation about the axis XX'.

Furthermore, the rotating part 91 of the collector provides the transfer of the electrical current for welding between a supply terminal 59 and the electrode 30 by means of a conductive liquid filling the annular space 60 of the collector 56, a tubular component 81 and a flexible conductor in the form of a thick braid 62 arranged axially inside the insulating flexible tubing 32'.

The rotating collector 56 also comprises two annular spaces 63 and 64 connected, respectively, to a cooling water feed tube 65 and a water return tube 66 passing through the stationary part of the collector bearing 56. At the periphery of the tube 61, the annular space 63 is in communication with the annular space situated at the periphery and outside the tubing 32'. The annular space 64 is in communication with the inner space of the tubing 32', by means of a central bore of the rotating part 91 of the collector and of the inner bore of the tube 61. The annular space at the periphery of the sheath 32' is in communication with an annular space situated between the tube 32 and the inner bore of the part 25b of the carrier 25. The feed water is thus conducted to the welding head 17, in the immediate vicinity of the electrode 30. This cooling water returns through the inside of the tubings 32 and 32' of the tube 61, to the collector 56.

The rotating part 91 is mounted so that it can rotate in the stationary part of the collector 56 by means of two bearings 67 and 67'. Four seals 68 provide separation and isolation of the annular spaces 60, 63 and 64. The stationary part of the collector 56 is, furthermore, pierced axially so as to provide a continuous passage for the inert purging gas towards the inner space of the bellows 55. The whole collector bearing 56 is arranged inside an insulating assembly 69 which insulates it electrically from the casing 18.

The motor 57 and the rotating collector 56 which are arranged in the motor casing 18 are thus responsible for driving in rotation, guiding and centering of the rotating assembly whose end part forms the rotating part of the welding head 17. This rotating end part is kept perfectly guided and centered by the plain bearings 27 and 28.

The transmission of the high-intensity welding current is provided by the rotating part 91, the conductor 62 and the tube 32, which are arranged axially in the carrier 25b. The bearings 27 and 28 inserted between the part 25b of the carrier and the bush 26 are made of an electrically insulating material, with the result that the bush 26 and the outer part 34 of the flexible tubing 16b are insulated from the electrical supply provided by centrally arranged components.

FIG. 5 shows the mechanical assembly 20 permitting the flexible section 22' to be connected to the long section 16a of the welding probe 16. This mechanical assembly comprises two threaded rings 20a and 20b, connected by a screw 20c.

The flexible section 22' is connected at one of its ends to the rear end of the casing 18 enclosing the motor 57, and at its other end to the forward ring 20a of the mechanical assembly 20. Inside the mechanical assembly 20 are arranged, inside an insulating sheath 70, the couplings 71 of the water feed and return tubes and the couplings for the electrical supply to the welding head. The electrical conductors intended to carry the welding current of very high intensity consist of braids 72 arranged inside insulating sheaths.

All the feed lines for electrical current, for cooling water and for the supply of inert purging gas 73 run inside the flexible tubing 16a which, at its end remote from the assembly 20, is connected to stationary supply points.

The rotating collector 56 provides the connection between the rotating part of the welding head and the parts which are stationary in the rotation connected to the stationary supplies inside the tubing 16a.

Reference will now be made to all the figures, and particularly to FIGS. 1, 6 and 7, to describe the operation of the welding device according to the invention.

When the entire device shown in FIG. 1 has been positioned, the translational moving device 21, 19 is used to move the welding probe 16, to the end of which the welding head 17 is fastened, inside the tubing 13, until the instant when the welding head 17 enters the guide tube 12. The protective sleeve 36 of the welding head 17 then comes into abutment as described above, and the translational movement continues as a movement of the welding head 25, 26 as such in the sleeve 36 and then in the tube 3.

Figure 6:
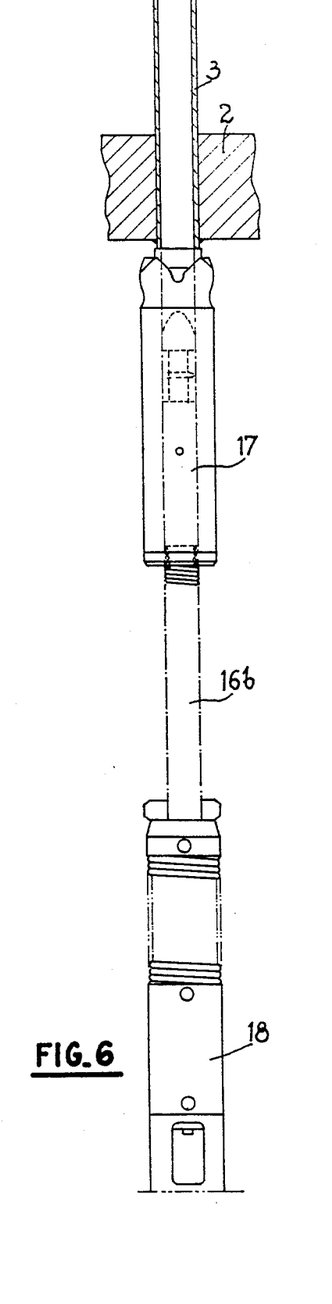
FIG. 6 is an elevation view of the welding probe in position vertically in line with a steam generator tube, before the welding head has been introduced into this tube.
Figure 7:
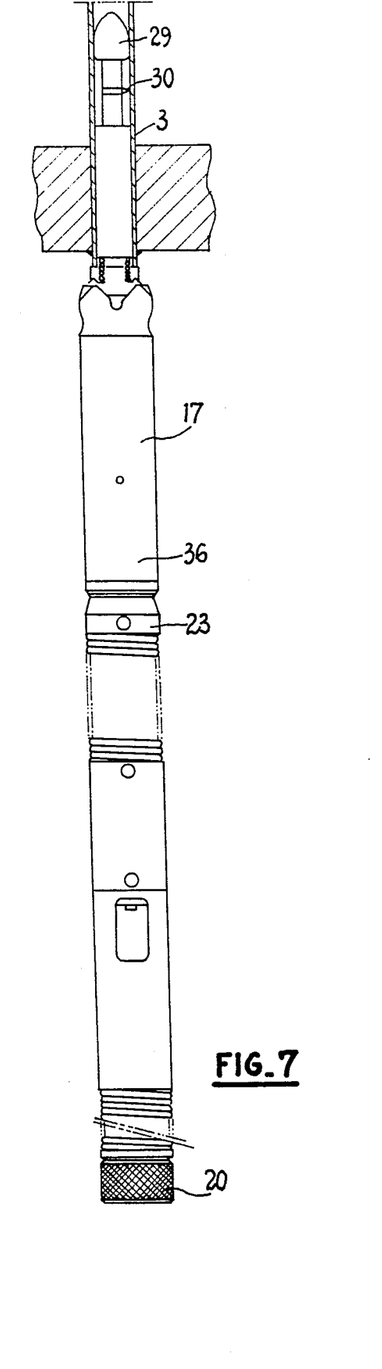
FIG. 7 is a partially sectioned elevation view of the welding probe in a working position, the welding head having been introduced into the tube.

FIG. 6 shows the upper part of the welding probe 16 at the instant of its coming into abutment in the guide tube 12. The upward movement of the welding head as such continues, either until the instant when the guiding knob 29 comes into abutment on the end of a small liner 80 arranged beforehand in the tube 3 for its repair, or until the instant when the forward face of the mechanical assembly 23 comes into abutment against the rear end of the protective sleeve 36 of the welding head 17.

If l denotes the length of the tubing 16b between the components 23 and 36, when the welding head is housed inside the sleeve 36, it can be seen that the maximum height of entry of the electrode 30 in the tube 3, i.e., the maximum height of operation in the tube for a welding operation, is substantially equal to l, since the position of the electrode 30 is very slightly set back in relation to the orifice of the tube 3 in the initial stage shown in FIG. 6.

It is thus possible to provide a sufficient length of the section 16b of the tubing to make it possible to work inside the tube 3 at any height and, for example, in the region of a spacer plate 10 situated anywhere in the steam generator. It is even possible to provide a sufficient length of the section 16b of the flexible tubing to perform a welding operation in the region of the upper spacer of the steam generator.

When the welding head has reached its working position along the height of the tube, the device 21, 19 for moving the welding probe 16 is stopped, this device being thereafter responsible only for holding the welding probe in position in the tube.

The required supplies of electrical current to the motor 57 and to the welding head, and the water feed and the purge gas feed to this welding head, are then ensured. The electrode 30 performs slightly more than one complete revolution, the welding being performed with a certain overlap; the welding of the end of the small liner 80 to the inner surface of the tube 3 is thus ensured.

The rotary motion of the electrode 30 is perfectly guided by the collector bearing 56 and by the plain bearings 27 and 28. In effect, the bush 26 ensures perfect centering of the welding head in the tube 3, the rotational guidance being provided both by the knob 29 and by the bearings 27 and 28, during the rotary movement of the electrode 30.

Rotational motion is transmitted to the electrode without torsion by the flexible tubing 35.

It is thus possible to perform a welding operation at any height in the tube 3, the electrode drive for its rotational motion being provided by a casing integral with the welding probe and positioned in the region of the tube plate during the welding.

Furthermore, the positioning of the device in the peripheral tubes of the bundle of the steam generator can be performed without difficulty, since the rigid head 17 is low in height, for example of the order of 25 cm. The motor casing 18 itself is of low height and can transmit a rotational torque with a slight disalignment in relation to the welding head 17.

Furthermore, the torque is transmitted to the welding head in a straight line or with a very slight disalignment, from a region situated in the vicinity of the inlet face of the tube plate.

The use of a collector bearing arranged in the motor casing makes it possible, on the one hand, to provide the distribution of the electrical current and of the fluids to the welding head without having a rotating member inside the second, long section of the flexible tubing and, on the other hand, to ensure the transmission of the rotation to the welding head, under very good conditions.

Different structures can be provided in the case of the various parts of the flexible tubing and of the components connecting this flexible tubing to the welding head and the motor casing. The electrical supplies and of the fluid supplies to the welding head may also be different.

Lastly, the invention applies not only to the repair of a steam generator by lining the tubes, but also to any orbital welding operation inside a tube of small diameter, for example a tube whose internal diameter is between 15 and 25 mm.

What is claimed is:

1. Device for rotary welding inside a tube (3) of small diameter, in particular inside a steam generator tube crimped at one of its ends into a tube plate (2) of great thickness, comprising a welding head with a diameter smaller than the internal diameter of the tube comprising a carrier (25) to which a guiding component (29) and a radially directed electrode (30) are fastened, which is fastened to the end of a flexible tubing (16) and by means for moving (18, 21, 19, 57) the welding head in axial translation in the tube (3) and in rotation about the tube axis, wherein the driving means (57) for driving the welding head in rotation is arranged in a motor casing (18) inserted between a first section (16a) and a second section (16b) of the flexible tubing (16), said second section (16b) connecting the casing to a bush (26) in which the carrier (25) of the welding head is rotatably mounted and comprising a flexible member (35) for transmitting rotational motion between the driving means (57) and the carrier (25) of the welding head, and said first section (16a) being connected at one of its ends to the motor casing (18) and in engagement with a puller-pusher device (21) for moving the flexible tubing (16) and thereby the welding head (17) and the motor casing (18).

2. Welding device according to claim 1, wherein inside the motor casing (18) there is arranged a collector bearing (56) whose rotating part (91) is connected to an output shaft (58) of the driving means (57) and whose part which is stationary in rotation comprises tubings (65, 66) and annular chambers (60, 63, 64) which are arranged around the rotating part (91), for transmitting electrical current permitting the welding and carrying fluids to the welding head (17).

3. Welding device according to claim 2, wherein the part which is stationary in rotation of the collector bearing (56) comprises at least two annular chambers (63, 64) one of which is connected to a cooling water delivery tubing (65) and the other to a cooling water return tubing (66).

4. Welding device according to claim 2, wherein the part which is stationary in rotation of the collector bearing (56) comprises at least one annular chamber (60) filled with a conductive liquid and arranged around the rotating part (91), for transmitting electrical current to said rotating part (91).

5. Welding device according to claim 1, wherein the flexible member (35) for transmitting rotational motion between the driving means (57) and the carrier (25) of the welding head consists of a tube whose wall comprises successives waves in a radial direction.

6. Welding device according to claim 5, comprising a leakproof and insulating sheath (32') inside the tube (35) and along its axial direction, to permit the flow of cooling water in its inner bore and in the annular space between its outer wall and the tube (35).

7. Welding device according to claim 6, comprising a flexible electrical conductor (62) inside the sheath (32') along its axial direction, for transmitting the welding current from the motor casing (18) to the welding head (17).

8. Welding device according to claim 1, wherein the bush (26) fastened to the end of the tubing (16) in which the support (25) of the welding head (17) is mounted so that it can rotate, is arranged in a removable protective sleeve (36) whose outer diameter is greater than the internal diameter of the tube (3).

9. Welding device according to claim 8, wherein the protective sleeve (36) comprises two integral coaxial small sleeves (37, 39) defining between them an annular space in which a small sleeve (38) is mounted so that it can slide in the axial direction, the inner sleeve (39) comprising a housing (40) for a ball (41) for axial locking of the bush (26) inside the sleeve (36), the small sliding sleeve (38) comprising a slot (53) which the ball (41) can enter in an unlocking position when the small sleeve (38) is moved axially relative to the small sleeves (37 and 39), and a spring (52) for returning the small sleeve (38) into a position for locking the bush (26) being inserted between the small sleeve (38) and the small sleeves (37 and 39) which are integral with one another.

10. Welding device according to claim 1, in the case where the tube (3) is a steam generator tube of a pressurized water nuclear reactor, one end of which is crimped into a tube plate (2) which has an entry face situated inside a waterbox (5), comprising a flexible guiding tubing (13) connecting the means (21, 19) for moving the welding head (17) in translation to a carrier device (11, 11a) situated inside the waterbox (5) in the vicinity of the tube (3) inlet.

11. Welding device according to claim 10, wherein the length of said second section (16b) of the flexible tubing connecting the welding head (17) to the motor casing (18) is substantially equal to the distance between the tube inlet and the region in which the welding is performed, the casing (18) being in the vicinity of the entry face of the tube plate during the welding operation.

12. Welding device according to claim 11, wherein the length of said second section (16b) of the flexible tubing (16) is substantially equal to the length of the straight branch of the steam generator tube.

* * * * *